United States Patent
Gelardi et al.

(10) Patent No.: US 7,377,386 B2
(45) Date of Patent: *May 27, 2008

(54) MECHANICAL ATTACHMENT FOR PACKAGING

(75) Inventors: Tatiana L. Gelardi, Kennebunkport, ME (US); Anthony L. Gelardi, Cape Porpoise, ME (US); Michael Thrower, Scarborough, ME (US)

(73) Assignee: PTG, LLC, Biddeford, ME (US)

( * ) Notice: Subject to any disclaimer, the term of this patent is extended or adjusted under 35 U.S.C. 154(b) by 447 days.

This patent is subject to a terminal disclaimer.

(21) Appl. No.: 10/921,350

(22) Filed: Aug. 19, 2004

(65) Prior Publication Data

US 2005/0205440 A1    Sep. 22, 2005

Related U.S. Application Data

(60) Provisional application No. 60/495,892, filed on Aug. 19, 2003.

(51) Int. Cl.
*B65D 85/57* (2006.01)
*B42F 3/00* (2006.01)

(52) U.S. Cl. .................. 206/308.1; 402/4; 402/5

(58) Field of Classification Search ................ 206/307, 206/307.1, 308.1, 311, 472, 474, 504, 558, 206/557–567; 402/4, 5, 19, 24; 16/225, 16/227, 383; 220/23.83
See application file for complete search history.

(56) References Cited

U.S. PATENT DOCUMENTS

| | | | | |
|---|---|---|---|---|
| 3,685,857 A | * | 8/1972 | Schlieben | 281/26 |
| 4,892,189 A | * | 1/1990 | Kunimune et al. | 206/232 |
| 5,381,920 A | * | 1/1995 | Lin | 220/843 |
| 5,799,782 A | * | 9/1998 | Gelardi | 206/308.1 |
| 5,904,245 A | * | 5/1999 | Tsujino | 206/308.1 |
| 2005/0103659 A1 | * | 5/2005 | Gelardi et al. | 206/308.1 |

* cited by examiner

*Primary Examiner*—J. Gregory Pickett
(74) *Attorney, Agent, or Firm*—James Creighton Wray; Clifford D. Hyra (57) ABSTRACT

The present invention is a system for attaching rigid holders together to form stacks of rigid holders. The present invention relates particularly to stacks of one or more rigid holders for containers holding compact discs and DVDs. The attachment system of the present invention allows for simple and efficient connection between individual rigid holders. Mechanical binding clips are inserted into cutouts on the spine region of rigid holders. The binding clips are flexed to fit within an opening and then un-flexed to lock the rigid holders and binding clips together. Male and female details allow for a secure hold. Extensions within the cutouts have barbs that fit over parts of the binding clips.

19 Claims, 9 Drawing Sheets

MECHANICAL ATTACHMENT FOR PACKAGING

This application claims the benefit of U.S. Provisional Application No. 60/495,892, filed Aug. 19, 2003.

BACKGROUND OF THE INVENTION

Data storage devices are delicate devices that are easily damaged by scratches, dirt and other consequences of handling. As such, there is a need for carrying and storing cases and other devices that protect compact discs, DVDs and other products during transporting and between uses.

Present solutions to this problem in packaging involve cases that allow the user to carry multiple discs at once. However, not all of these devices are easy to use.

Many existing systems for transporting data storage devices do not allow secure and simple movement of multiple discs.

Needs exist for improved methods for storing, protecting and transporting data storage devices in a less expensive and more secure manner.

SUMMARY OF THE INVENTION

The present invention is a system for attaching rigid holders together to form stacks of rigid holders. The present invention relates particularly to stacks of one or more rigid holders or containers holding compact discs and DVDs. The attachment system of the present invention allows for simple and efficient connection between individual rigid holders.

The present invention is a mechanical attachment apparatus for packaging. The mechanical attachment system begins with one or more rigid holders, such as containers for storing digital media. One or more rigid holders are aligned by a groove on each rigid holder and formed into a stack of rigid holders.

Each rigid holder has one or more cutouts on a spine. The cutouts may be on any shape, but a preferred embodiment utilizes a roughly trapezoidal cutouts. In a trapezoidal embodiment, the shorter parallel side of the cutout is in a plane with the spine, the longer parallel side is within the one or more rigid holders, and the sides slope outward from the spine to the longer parallel side. Generally, the dimensions of the cutouts mirror the dimensions of a mechanical binding clip and the mechanical binding clips are designed to fit within the cutouts to close tolerances that prevent slipping or shifting of the rigid holders. Furthermore, the cutouts on the spine of each rigid holder align with the cutouts on each previous and subsequent rigid holder.

Within each cutout is an extension that extends from the base of the cutout. In a preferred embodiment, the extension is also roughly trapezoidal shaped. The extensions may have raised regions at the ends of the top side of the extension and a depression in the middle of the top side. Male details, such as barbs, are located on opposite sides of the extension, preferably, on the raised regions of the extension.

Mechanical binding clips are designed to fit within the cutouts on each rigid holder. Multiple mechanical binding clips are strung together in series by hinges, such as living hinges. The number of cutouts determines the number of mechanical binding clips needed. As stated above, the shape of the mechanical binding clips mirrors the shape and dimensions of the cutouts. In one embodiment, the mechanical binding clips are roughly trapezoidal in shape.

The mechanical binding clips have female details that complement the male details on the extensions and allow for secure connections between the mechanical binding clips and the rigid holders. The mechanical binding clips also have a central cutout in the base of the mechanical binding clip. In a preferred embodiment, the central cutout is roughly triangular in shape. The central cutout splits the mechanical into two halves. A flex point at the top of the central cutout allows the two halves of the mechanical binding clips to bend towards each during insertion of the mechanical binding clips into the cutouts.

Additionally, the spine of each rigid holder may have contours that correspond to complementary contours on the mechanical binding clips. This allows proper alignment of the mechanical binding clips and the rigid holders. Preferably, the contours on the spine are points and the complementary contours on the mechanical binding clips are inverted points.

The mechanical binding clips are inserted into the cutouts by first compressing the ends of the mechanical binding clips towards each other. This flexes the mechanical binding clip around a flex point above the central cutout. The flexed mechanical binding clips are then depressed into the cutouts. Once the flexed mechanical binding clip is inside the cutout, pressure is applied to the top side of the mechanical binding clips. This pressure causes the mechanical binding clips to return to an unflexed position, while snapping the male details on the extensions into the female details on the mechanical binding clips. The mechanical binding clip is then secure in the cutout and the rigid holders are connected together.

These and further and other objects and features of the invention are apparent in the disclosure, which includes the above and ongoing written specification, with the claims and the drawings.

DETAILED DESCRIPTION OF THE PREFERRED EMBODIMENTS

The present invention is a system for attaching rigid holders together to form stacks of rigid holders. The present invention relates particularly to stacks of one or more rigid holders for containers holding compact discs and DVDs. The attachment system of the present invention allows for simple and efficient connection between individual rigid holders.

Figure 1:
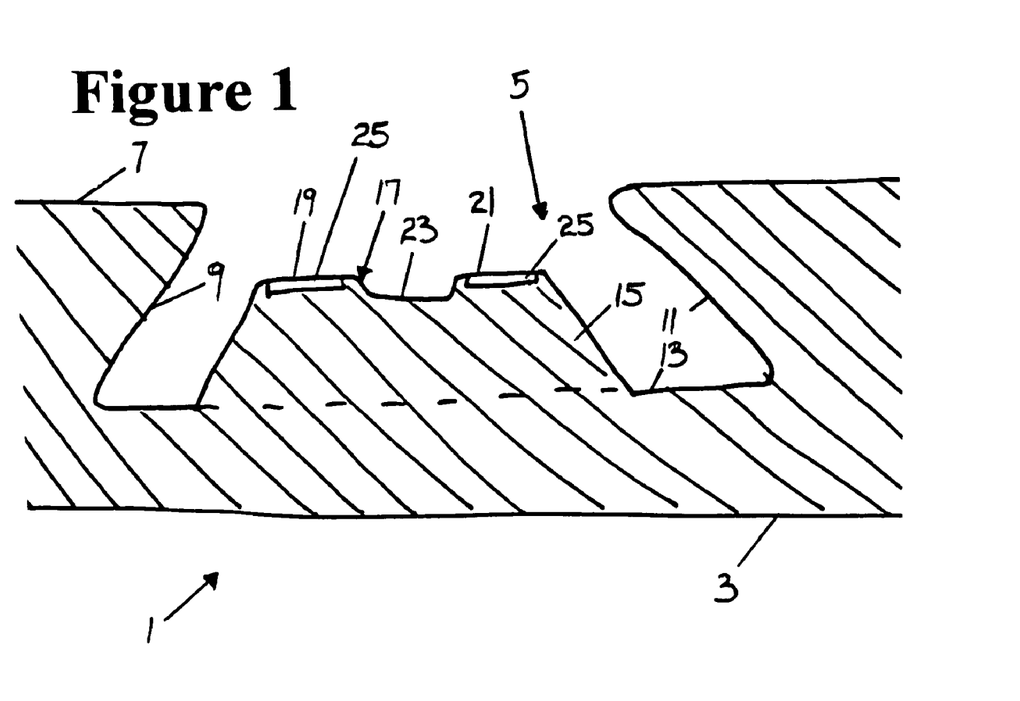
FIG. 1 is a side view of cutout opening in a rigid holder with an extension.

FIG. 1 shows a detail of a mechanical binding section 1 of a rigid holder 3. Along the spine 7 of each individual rigid holder 3 in a stack are one or more binding sections 1. Each rigid holder 3 has one or more female cutouts 5 that accept a mechanical binding system. The cutouts 5 are roughly trapezoidal in shape with the smaller parallel surface as the opening on the spine 7 of the rigid holder 3. Sloping sides 9, 11 extend outward from the spine 7 cutout 5 opening. A lower side 13 of the roughly trapezoidal shape is the base of the mechanical binding system.

In roughly the center of the lower side 13 of the cutout 5 is an extension 15 that is also roughly trapezoidal in shape. Again, the smaller parallel side 17 of the extension 15 is closest to the spine 7 of the rigid holder 3. This side 17 has raised areas 19, 21 on the outer ends and a depression 23 between the ridges 19, 21. Each extension 15 has one or more barbs 25 on each side of the extension 15. These barbs 25 do not allow the rigid holder 3 to be withdrawn from within a stack of individual rigid holders 3.

Figure 2:
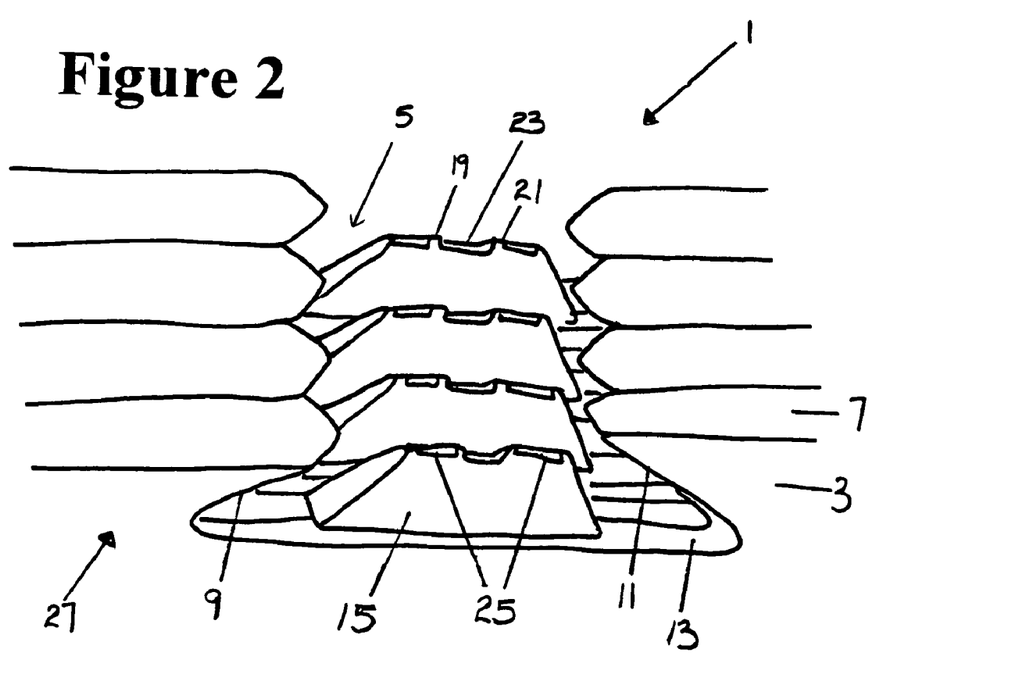
FIG. 2 is a perspective view of a series of cutout openings with extensions in a stack of rigid holders.

FIG. 2 shows a stack 27 of rigid holders 3. Each individual rigid holder 3 in a stack 27 has a cutout 5 and extension 15 that line up with each previous and subsequent rigid holder 3. The spine 7 sections of the rigid holders 3 may have a pointed or other shape near the cutout 5. Mechanical binding clips 35 have an inverted pointed shape or other complementary shape that tracks the pointed or other shape in the rigid holders 3 that ensures proper alignment of the clips 35 in the cutouts 5.

Figure 3:
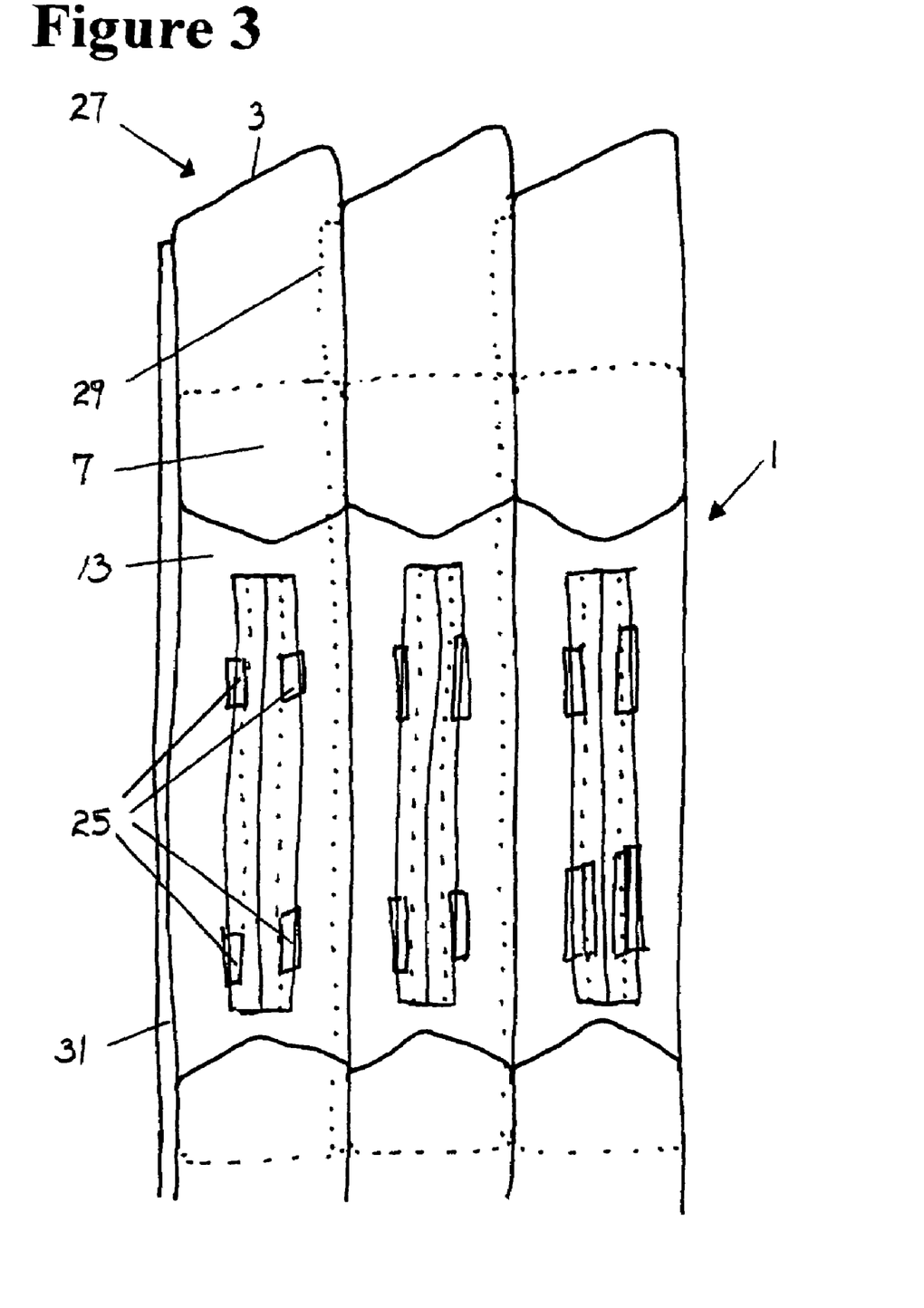
FIG. 3 is an end view of a series of cutout openings with extensions in a stack of rigid holders.

FIG. 3 shows an end view of a stack 27 of rigid holders 3. The rigid holders 3 have grooves 29 that ensure proper alignment. A cover 31 may be attached to the end holders 3.

Figure 4:
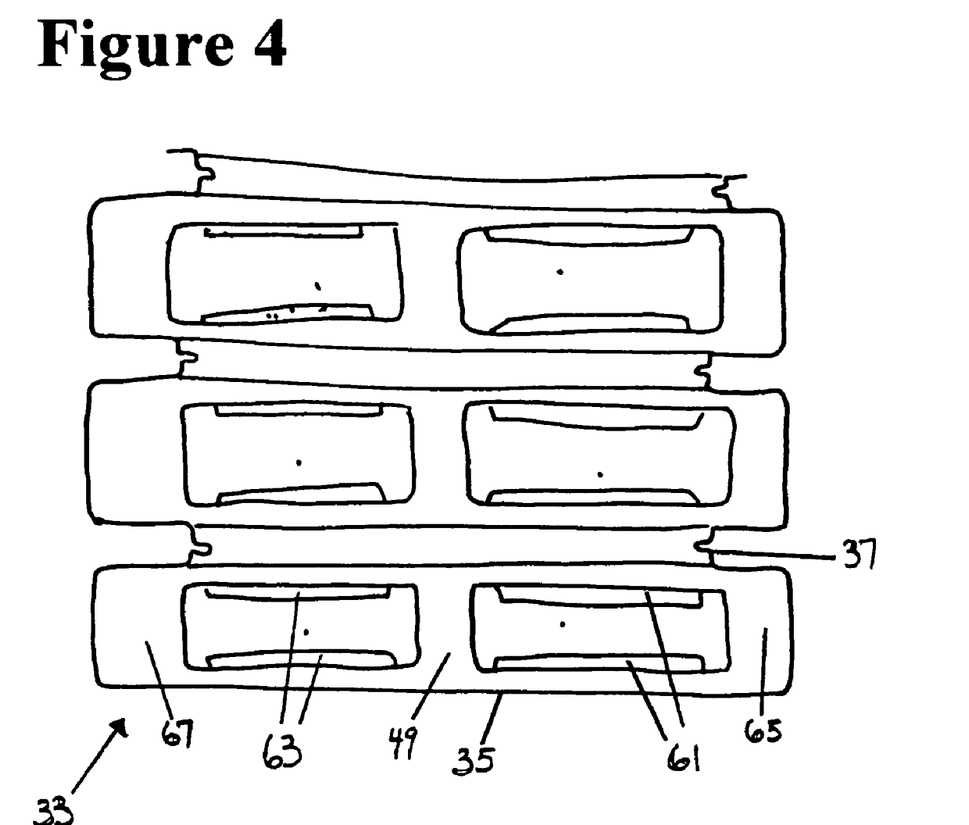
FIG. 4 is a top view of a series of mechanical binding clips.

FIG. 4 shows a top view of a series 33 of mechanical binding clips 35 that secure individual rigid holders 3 into stacks 27. Each individual clip 35 is attached in a series 33 through a hinge 37. The hinge 37 allows a stack of rigid holders 27 to flex and open like a book, with the rigid holders 3 as pages. The number of individual rigid holders 3 determines the number of clips 35 in a series 33.

Figure 5:
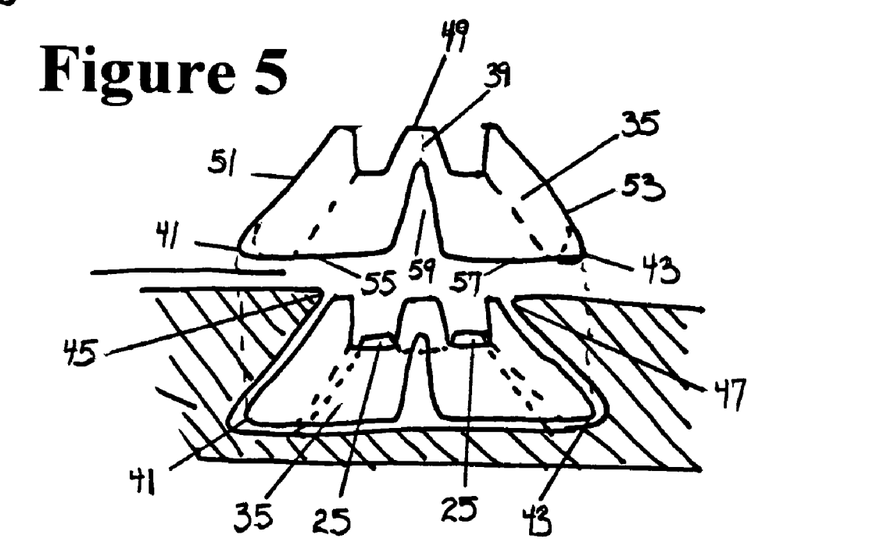
FIG. 5 is a side view of a mechanical binding clip being inserted into a cutout opening.

FIG. 5 shows a mechanical binding clip 35 locking into a cutout 5 in a rigid holder 3. The binding clip 35 is roughly trapezoidal with the smaller parallel surface nearest to the spine 7 after installation. The sides 51, 53 of the binding clip 35 slope outwards. The bottom surface of the binding clip 35 is divided into two halves 55, 57 that are separated by a roughly triangular cutout 59 that allows the binding clip 35 to flex. The binding clip 35 flexes at a point 39 so that ends 41, 43 of the clip 35 pass within ends 45, 47 of the cutout 5. Once within the cutout 5, pressure is applied to the upper surface 49 of the clip 35 and the clip 35 returns to its non-flexed position. In this manner, the mechanical binding clip 35 is locked into rigid holder 3. The mechanical binding clips 35 snap into the cutouts 5 through male and female details. Once locked, the individual rigid holders 3 cannot be separated.

Figure 6:
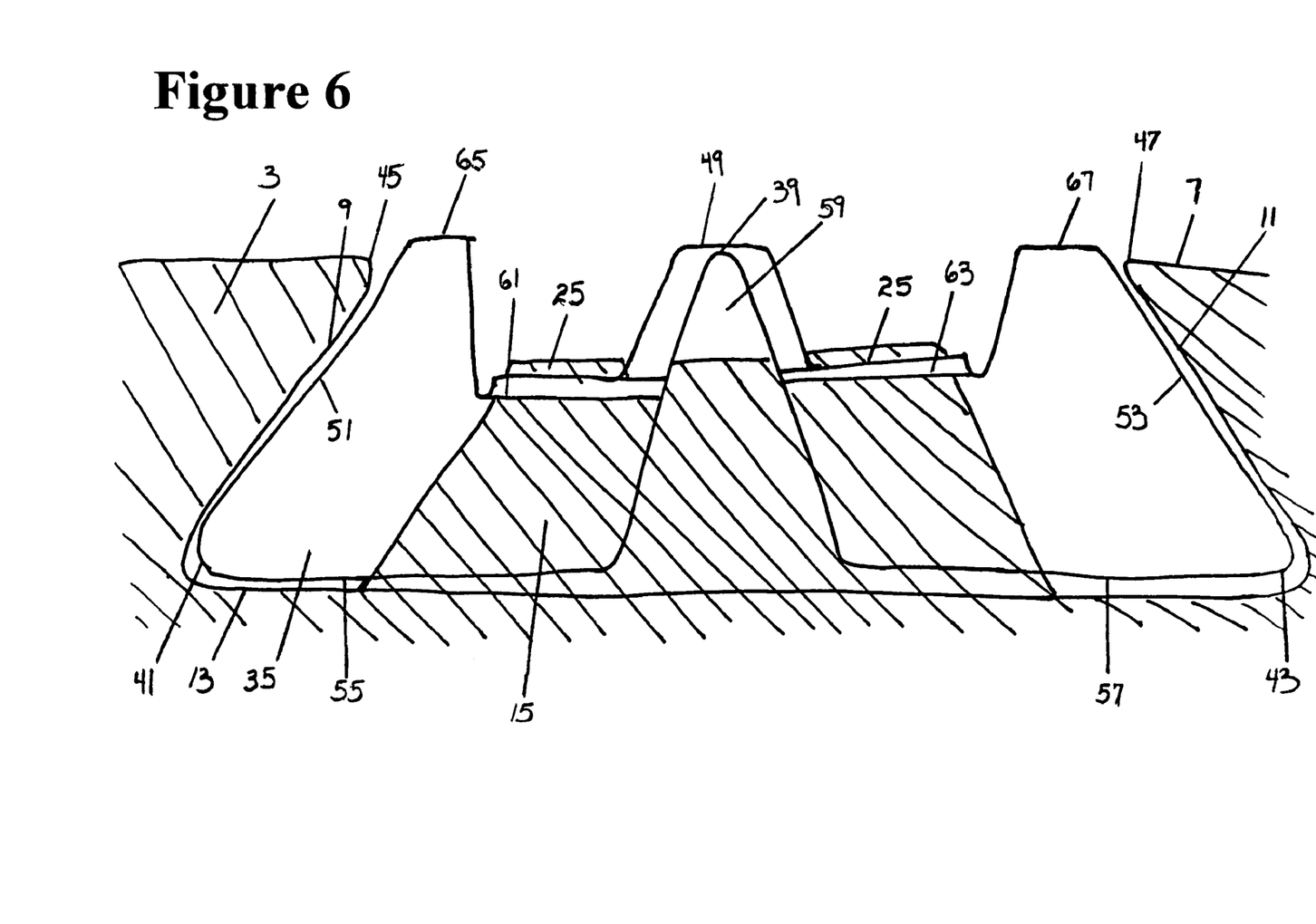
FIG. 6 is a close-up side view of an installed mechanical binding clip.

FIG. 6 is a detail of the mechanical binding clip 35 installed in the attachment section 1 of a rigid holder 3. Sides 51, 53 of the binding clip 35 fit against sides 9, 11 of the rigid holder 3. The bottom sections 55, 57 sit on the bottom 13 of the cutout 5. The upper surface 49 of the binding clip 35 has two ledges 61, 63 that correspond to the barbs 25 on the extension 15. The barbs 25 snap over the ledges 61, 63 and do not allow the rigid holders 3 to be removed. The upper surface also has raised regions 65, 67 on the edges of the top surface 49.

Figure 7:
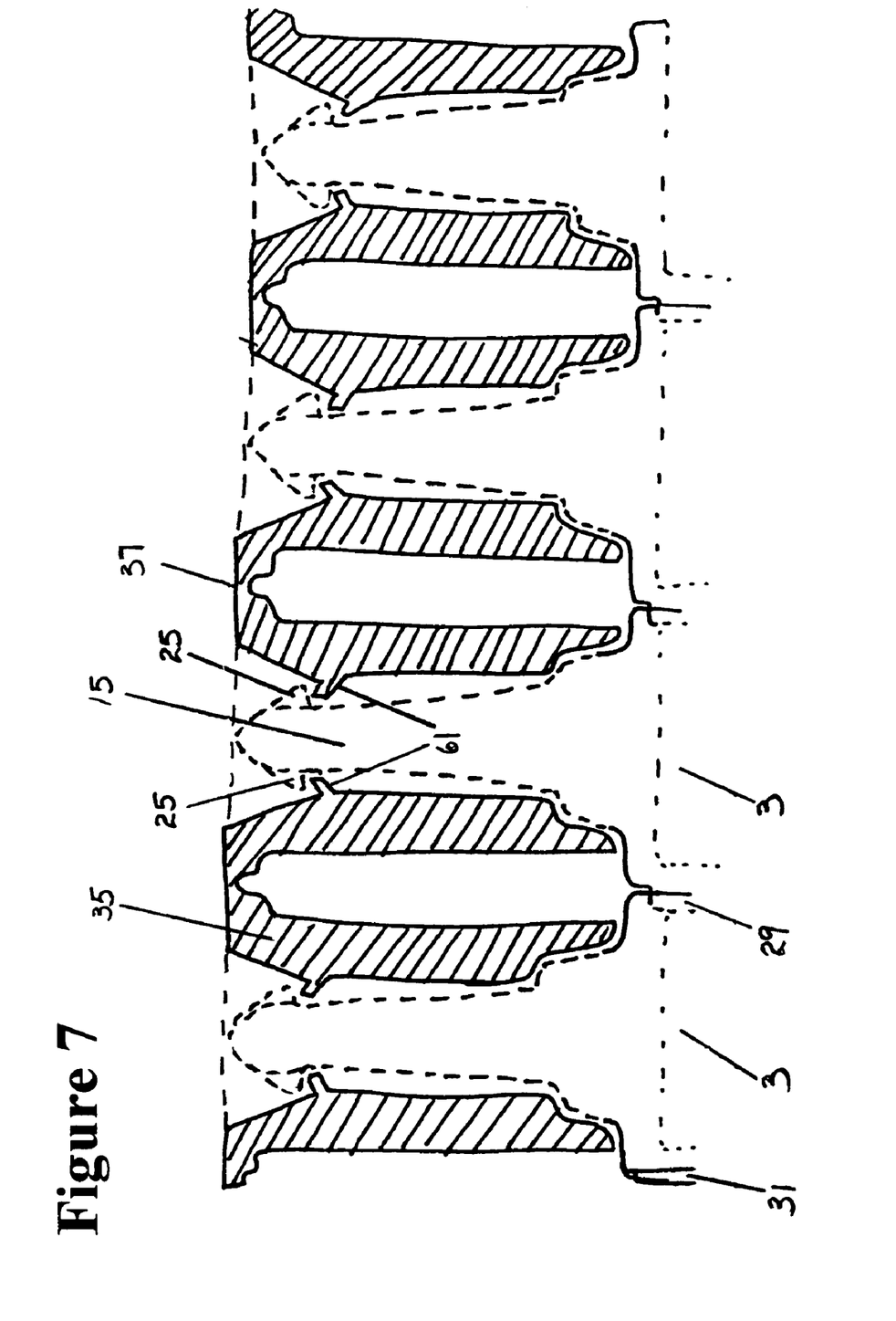
FIG. 7 is a diagram of a series of installed mechanical binding clips on a series of rigid holders.

FIG. 7 shows a series 27 of rigid holders 3 attached to a series 33 of mechanical binding clips 35. The edges of the binding clips 35 are contoured to fit with the contours of the rigid holders 3 and the cutouts 5.

Figure 12:
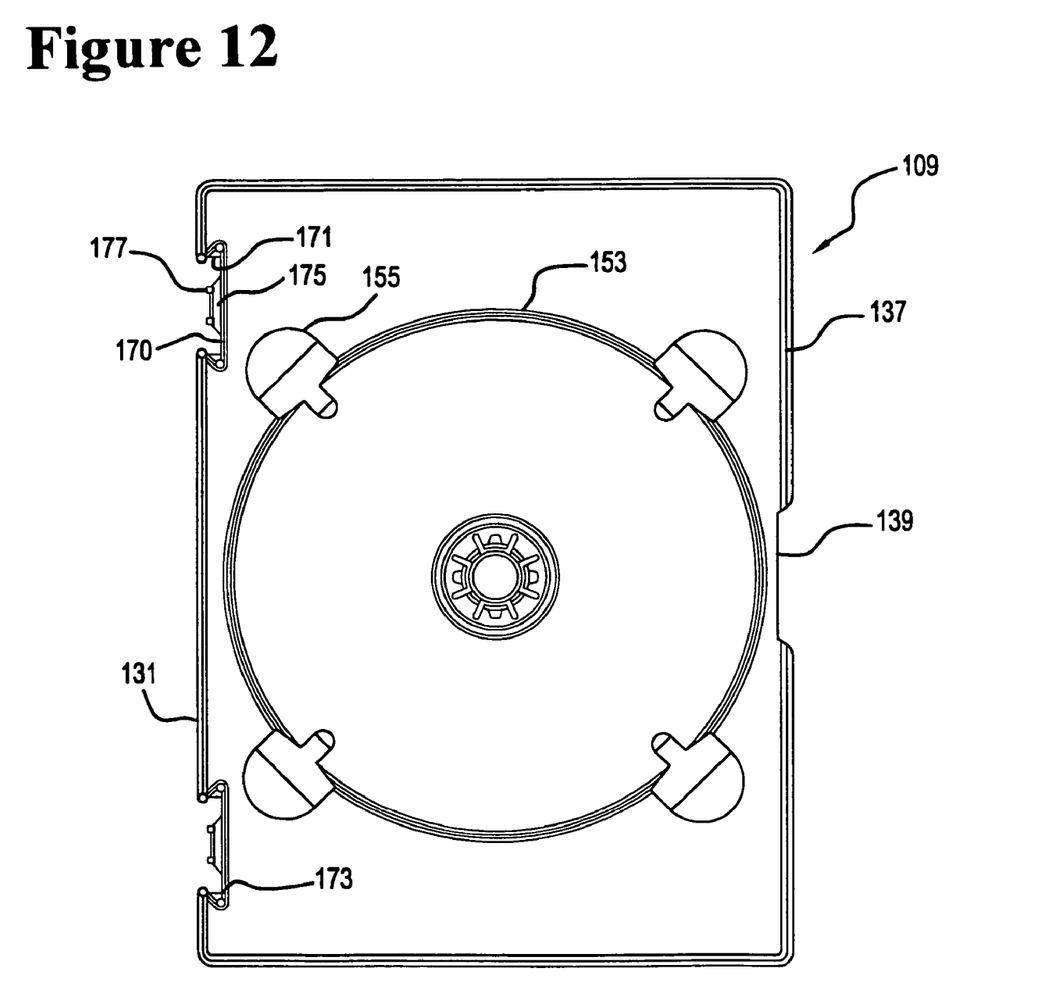
FIG. 12 is a front view of a rigid holder.
Figure 13:
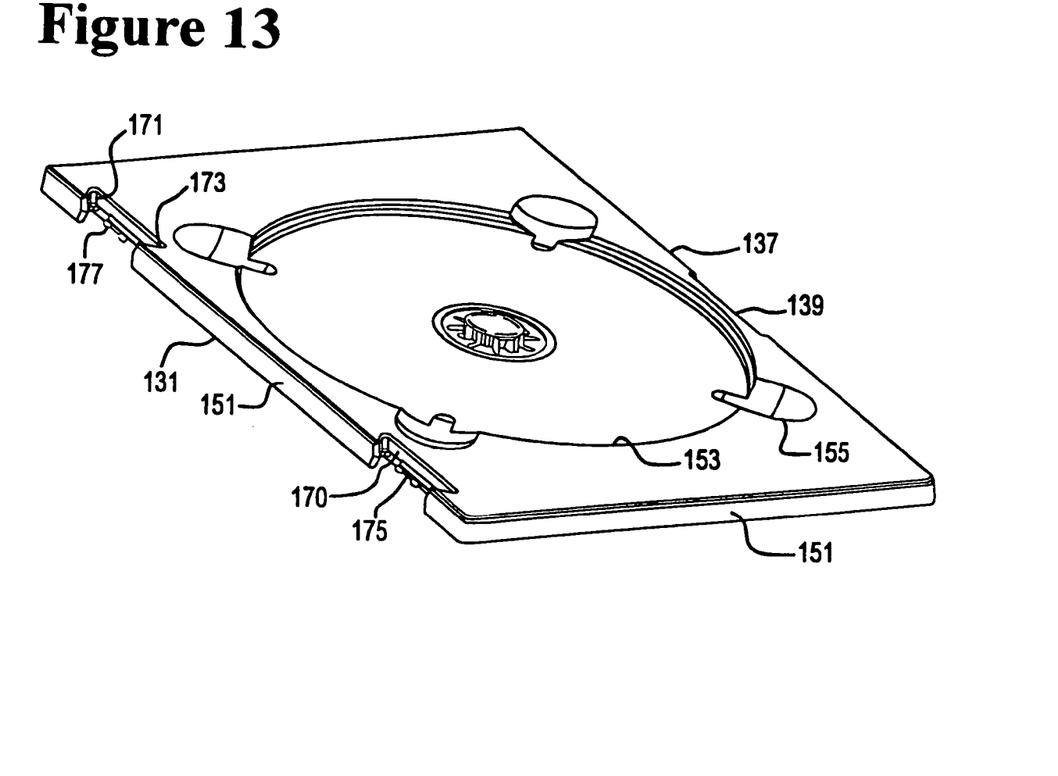
FIG. 13 is a perspective view of the rigid holder showing a connecting edge.
Figure 14:
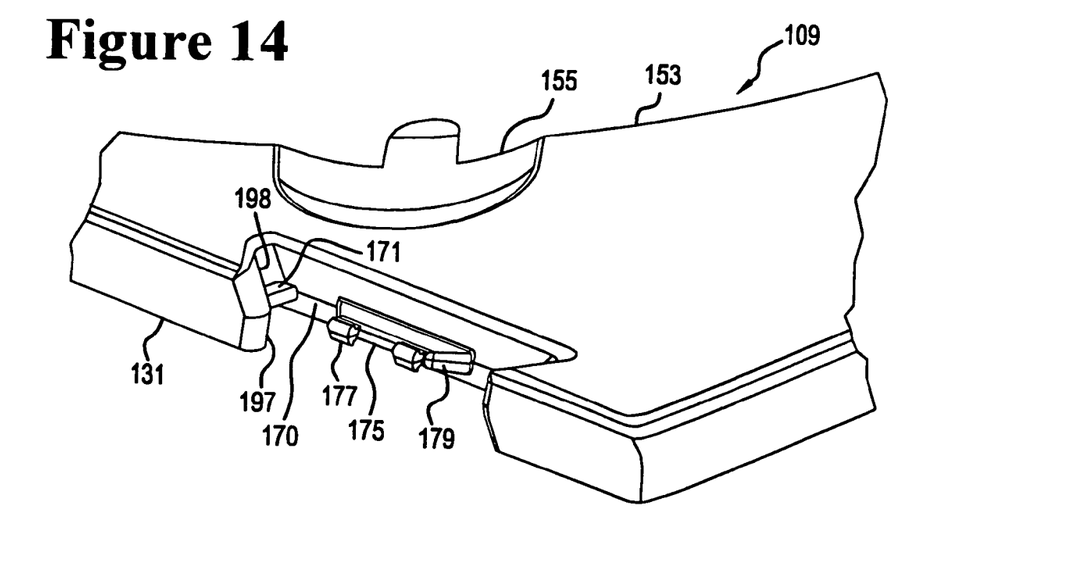
FIG. 14 is a perspective detail of the rigid holder cutout.

FIGS. 8-11 show strips 161 of mechanical binding clips 111 that are connected together by living hinges 113. A flex point 163 extends along the strip 161 to separate each of the mechanical binding clips 111 into identical halves 165. In a preferred embodiment, the mechanical binding clips 111 have divided ends 167 which form receivers 169 for aligning projections 171 in cutouts 170 in mounting edges 131 of rigid holders 109, as shown in FIGS. 12-14. The divided ends 167 of the sides 165 fit in corners 173 of the mounting recesses 170. Sloping sidewalls 195 of sides 165 have inverted V-shaped grooves 196 to receive the complementary V-shaped sidewalls 197 of the sloping sides 198 of the cutout 170. The cutouts 170 have extensions 175 with barbs 177.

The sides 165 of the mechanical binding clips 111 have openings 181 into which the extension 175 fit. The barbs 177 are engaged by inward-extending snaps 183 in small openings 185, on the top surface of the mechanical binding clips 111, to retain the clips in the recess. Sloping walls 189 of holes 181 are engaged by sloping edges 179 of the extensions 175 to hold the sides 165 of the mechanical binding clips 111 outward, with the ends 167 in the corners 173 and the aligning projections 171 securely in the receivers 169 and the complementary V-shaped grooves 196. Edges 166 of the ends 167 are tapered inward to guide the receivers 169 into alignment with the aligning projection 171, which occurs in the initial assembly.

To assemble the clips 111 on the rigid holders 109, the clips 111 are bent inward along the flex point 163. After receivers 169 are positioned on alignment projections 171, further inward pressing on the back 162 of the strip 161 engages the snaps 183 on the detents 177, holding the clips straightened with ends 167 outward. Enlarged rounded feet 168 on ends 167 ensure that the clips 111 may be pressed inward sufficiently to snap the snaps 183 over the detents 177 and to provide over-the-center clamping.

When assembling the holder sets, preferably the rigid holders 109, mounting edges 131 and cutouts 170 are aligned. The strip 161 is bent along flex point 163, and all clips 111 are connected to the aligned rigid holders 109 at one time.

Figure 8:
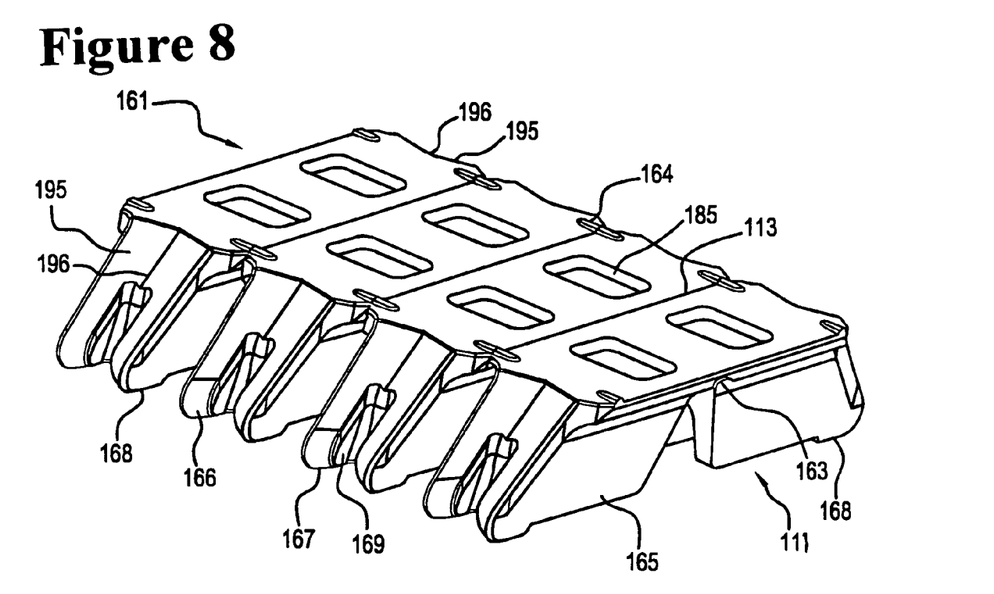
FIG. 8 is a top perspective view of a series of mechanical binding clips.
Figure 9:
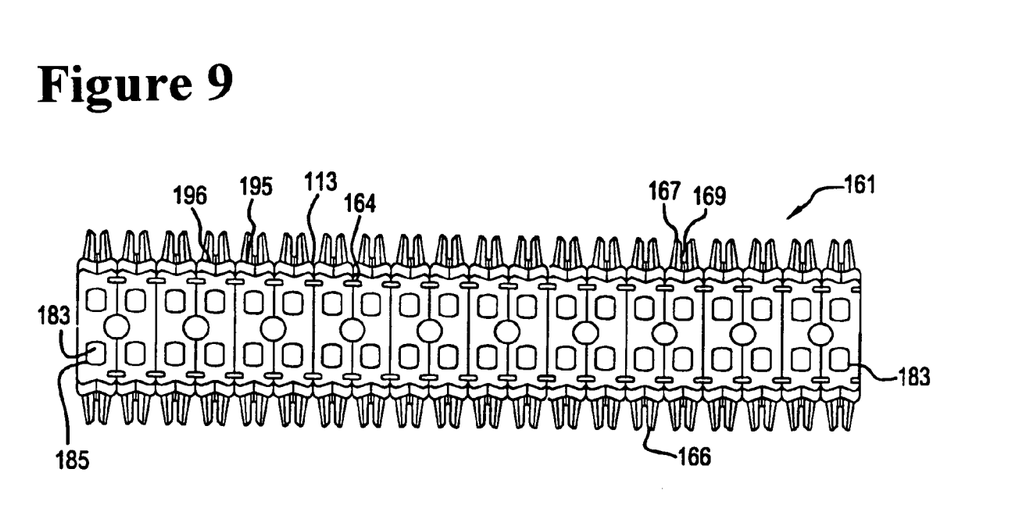
FIG. 9 is a top view of a series of mechanical binding clips.
Figure 10:
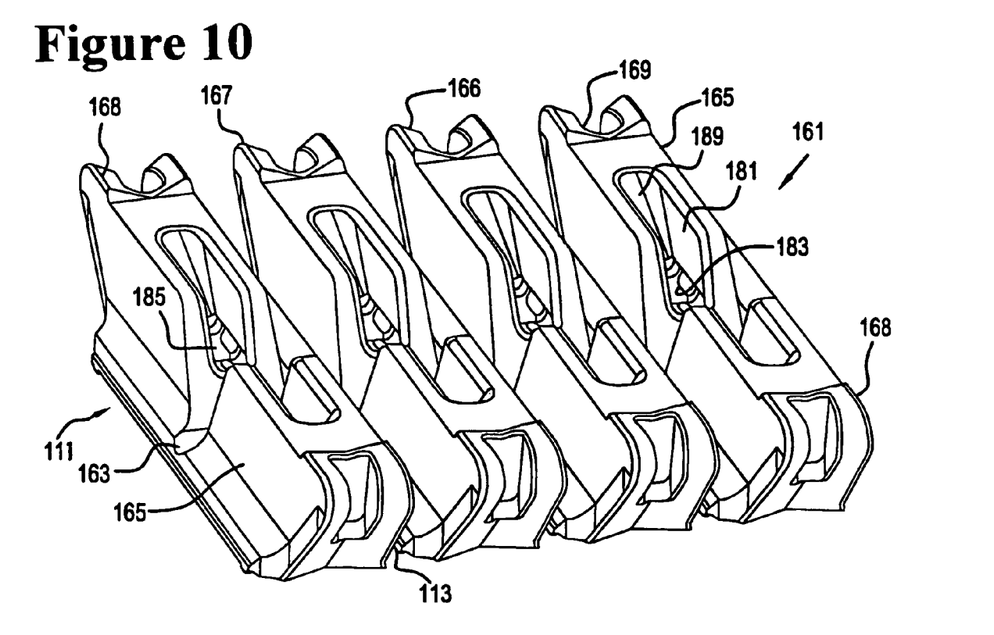
FIG. 10 is a bottom perspective view of a series of mechanical binding clips.
Figure 11:
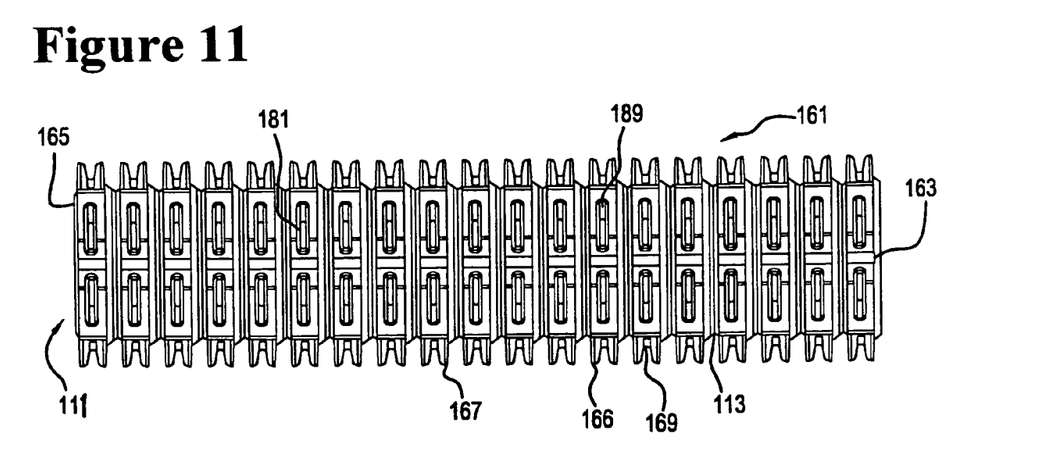
FIG. 11 is a bottom view of a series of mechanical binding clips.

As shown in FIGS. 8 and 10, tear-preventing ribs 164 are positioned at ends of living hinges 113 to resist tearing of the living hinges.

FIG. 12 shows a rigid holder 109 capable of holding digital media. The rigid holder 109 may have a fastener recess 139 in an opening edge 137. The rigid holders 109 have rearward extending rims 151 and central depressions 153. Edge recesses or bevels on front edges receive rear edges of the rims to resist sliding of the trays when the book is closed. Depressions 153 hold media discs on central rosettes. Finger holes 155 aid in removal of discs.

While the invention has been described with reference to specific embodiments, modifications and variations of the invention may be constructed without departing from the scope of the invention, which is defined in the following claims.

The invention claimed is:

1. A mechanical attachment apparatus for packaging comprising:
   more than one rigid holder,
   one or more cutouts on a spine of each rigid holder,
   extensions extending from a base of the one or more cutouts on each rigid holder,
   first complementary details on the extensions within the one or more cutouts on each rigid holder,
   one or more mechanical binding clips for fitting within the one or more cutouts on each rigid holder,
   second complementary details on the one or more mechanical clips for interengaging with the first complementary details on the extensions within the one or more cutouts on each rigid holder,
   a central cutout in a base of the mechanical binding clip, and
   a flex point at the top of the central cutout on each mechanical binding clip for bending the mechanical binding clip lengthwise during insertion of the mechanical binding clip in one of the rigid holders, without which each mechanical binding clip would be too long to enter the outer opening of the one or more cutouts of each rigid holder,
   wherein the rigid holders comprise plural aligned rigid holders for forming a stack of one or more rigid holders and wherein the one or more binding clips comprise plural binder clips attached to at least one flexible strap extending over the tops of the binder clips, for holding the holders aligned and allowing rotation of the holders on the flexile strap.

2. The apparatus of claim 1, wherein the one or more rigid holders are containers for holding digital media and wherein the first complementary details comprise male details and the second complementary details comprise female details.

3. The apparatus of claim 1, further comprising grooves on the rigid holders for aligning the one or more rigid holders into a stack of rigid holders.

4. The apparatus of claim 1, wherein the cutouts are roughly trapezoidal in shape.

5. The apparatus of claim 4, wherein the shorter parallel side of the cutout is in a plane with the spine, the longer parallel side is within the one or more rigid holders, and the sides slope outward from the spine to the longer parallel side.

6. The apparatus of claim 1, wherein the dimensions of the one or more cutouts mirror the dimensions of the one or more mechanical binding clips.

7. The apparatus of claim 6, wherein the one or more mechanical binding clips fits with close tolerance into the one or more cutouts.

8. The apparatus of claim 1, wherein the one or more cutouts on each rigid holder align with the one or more cutouts on each previous or subsequent rigid holder in a stack of rigid holders.

9. The apparatus of claim 1, wherein the shape of the extension mirrors the shape of the cutout.

10. The apparatus of claim 9, wherein the extensions are roughly trapezoidal in shape.

11. The apparatus of claim 1 wherein the one or more mechanical binding clips are connected together by hinges.

12. The apparatus of claim 1, wherein the one or more mechanical binding clips are attached in series.

13. The apparatus of claim 1, wherein the number of mechanical binding clips corresponds to the number of cutouts.

14. A mechanical attachment apparatus for packaging comprising:
   more than one rigid holder,
   one or more cutouts on a spine of each rigid holder,
   extensions extending from a base of the one or more cutouts on each rigid holder,
   first complementary details on the extensions within the one or more cutouts on each rigid holder,
   one or more mechanical binding clips for fitting within the one or more cutouts on each rigid holder,
   second complementary details on the one or more mechanical clips for interengaging with the first complementary details on the extensions within the one or more cutouts on each rigid holder,
   a central cutout in a base of the mechanical binding clip, and
   a flex point at the top of the central cutout on each mechanical binding clip for bending the mechanical binding clip lengthwise during insertion of the mechanical binding clip in one of the rigid holders, without which each mechanical binding clip would be too long to enter the outer opening of the one or more cutouts of each rigid holder,
   wherein the extensions have raised regions at the ends of a top surface and a depression in the center of the top surface.

15. The apparatus of claim 14, wherein male details are located on the top surface of the extensions.

16. The apparatus of claim 15, wherein male details are located on the raised regions at the ends of the top surface.

17. The apparatus of claim 15, wherein the male details are barbs.

18. The apparatus of claim 17, wherein each extension has multiple barbs with one or more barbs facing opposite directions.

19. The apparatus of claim 18, wherein the barbs are located on opposite sides of the extension.

* * * * *